US006699420B2

(12) United States Patent
Kashiyama

(10) Patent No.: US 6,699,420 B2
(45) Date of Patent: Mar. 2, 2004

(54) METHOD OF MANUFACTURING A CONNECTOR HAVING REAR HOLDERS

(75) Inventor: Motohisa Kashiyama, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/956,035

(22) Filed: Sep. 20, 2001

(65) Prior Publication Data

US 2002/0013105 A1 Jan. 31, 2002

Related U.S. Application Data

(62) Division of application No. 09/748,383, filed on Dec. 27, 2000.

(30) Foreign Application Priority Data

Dec. 27, 1999 (JP) ....................................... P. 11-370974

(51) Int. Cl.[7] ................................................ B29C 45/00

(52) U.S. Cl. .................... 264/238; 264/318; 264/328.1; 264/334

(58) Field of Search ................................. 264/238, 318, 264/328.1, 334; 29/428

(56) References Cited

U.S. PATENT DOCUMENTS 5,709,831 A * 1/1998 Endo et al. ................. 264/238
5,915,760 A * 6/1999 Kawase et al. ............... 29/883

FOREIGN PATENT DOCUMENTS

JP 6-151002 5/1994 ........... H01R/13/42
JP 8-45596 2/1996 ........... H01R/13/42
JP 8-138783 5/1996 ........... H01R/13/42
JP 8-250183 9/1996 ........... H01R/13/42

OTHER PUBLICATIONS

Patent Abstract of Japanese No. 06–151002, dated May 31, 1994.

Patent Abstract of Japanese No. 08–138783, dated May 31, 1996.

Patent Abstract of Japanese No. 08–045596, dated Feb. 16, 1996.

* cited by examiner

*Primary Examiner*—Michael Colaianni
*Assistant Examiner*—Monica A Fontaine
(74) *Attorney, Agent, or Firm*—Sughrue Mion, PLLC

(57) ABSTRACT

A connector (1) with rear holders, which connector comprises a housing (2) having a plurality of terminal housing chambers (3), and the rear holders (20*a*) and (20*b*) which are laid across the housing (2) and temporarily and regularly retained in the housing. One of the rear holders (20*a*) and (20*b*) includes a retaining hole (22) and a retaining pawl (23). On each side of the housing exist a temporarily retaining projection (4) having a tapered surface (5) over the whole of its surface, and a tapered retaining step (6). A stooping contact face (7) is also provided on the surface of the rear end portion of the housing (2). Therefore, as the rear holders (20*a*) and (20*b*) are pivoted when the retaining holes (22) are mated with the respective temporarily retaining projections (4), the retaining pawls (23) are mated with the retaining steps (6) and the undersurfaces of the rear holders (20*a*) and (20*b*) are brought into contact with the respective contact faces (7), whereby the rear holders (20*a*) and (20*b*) are temporarily retained in the housing (2).

7 Claims, 16 Drawing Sheets

METHOD OF MANUFACTURING A CONNECTOR HAVING REAR HOLDERS

This is a divisional of application Ser. No. 09/748,383 (Confirmation No. 3798) filed Dec. 27, 2000, the disclosure of which is incorporated therein by reference.

BACKGROUND OF THE INVENTION

1. Technical Field

The present invention relates to a connector. The connector has rear holders which are first molded together with a housing in a plurality of molds. Then, the rear holders are temporarily retained in the housing as the molds are removed and regularly retained therein after connecting terminals are inserted. And the present invention relates to a method of manufacturing thereof.

2. Related Art

Heretofore, there exist various connectors with rear holders and methods of manufacturing such connectors with rear holders known to the art as disclosed in JP-A-8-250183, for example.

In a connector 51 with related rear holders shown in FIGS. 16 to 18, rear holders 70*a* and 70*b* that are temporarily and regularly retained in such a manner as to be laid across opposite side portions of a housing 52 are held in the temporarily retaining positions. The housing has a plurality of terminal housing chambers 53. Then connecting terminals 32 are inserted from the rear end of the housing 52 and respectively retained by housing lances 81 in the terminal housing chambers 53. Further, the rear holders 70*a* and 70*b* are retained in the regularly retaining positions, so that the connecting terminals 32 are doubly retained therein.

More specifically, stooping guide holes 72 are provided in the respective side pieces of the rear holder 70*a*. Secondary retaining projections 73 for secondarily retaining each connecting terminal 32 are provided in the front end portion of the undersurface of the rear holder 70*a*. Openings 53*a* for inserting the secondary retaining projection 73 obliquely above from the temporarily retaining position to the regularly retaining position is provided in the upper central portion of each terminal housing chamber 53. On opposite sides 52*b* of the housing 52, there are also provided a stooping guide rail 54 having a tapered surface engaged with the guide hole 72, and a regularly retaining projection 55 that is obliquely positioned in front of each guide rail 54.

As opposite sides 52*b*, where the guide rails 54 and the regularly retaining projections 55 are projected, are set narrower than the whole width of the opposite sides 52*a* of the front portion, jutties 56 are set to opposite sides 52*b* in parallel to and below the guide rails 54 and the regularly retaining projections 55 whereby to make opposite sides 52*b* equal in width to opposite sides 52*a*. Because the lower rear holder 70*b* in the drawings is substantially equal in structure to the rear holder 70*a*, the description thereof will be omitted.

In the connector 51 with the related rear holders, the tapered surface provided on the surface of each guide rail 54 causes the side pieces 71 are bent to opposite directions when the rear holder 70*a* on one side is forced in from above the rear end portion of the housing 52. Thus the guide holes 72 are mated with the guide rails 54, so that the rear holder 70*a* is held in the temporarily retaining position of the housing 52. Moreover, the rear holder 70*b* is also held in the temporarily retaining position of the housing 52.

When the connecting terminal 32 is subsequently inserted from behind the terminal housing chamber 53, it is primarily retained by the housing lance 81. When the rear holder 70*a* and the rear holder 70*b* are pressed forward, the guide holes 72 are guided by the guide rail 54 so and the front ends of the side pieces 71 climb over the regularly retaining projections 55. Then the front end portions of the guide holes 72 is retained by the regularly retaining projections 55 and the secondary retaining projections 73 are caused to enter the terminal housing chambers 53 from the openings 53*a*.

In a case where the housing 52 and the rear holders 70*a* and 70*b* are separately formed before being gathered at one place for the assembly of them, however, it becomes necessary carrying them to fabrication places and performing not only assembly but also inspection steps in addition to individually controlling such parts as housings 52 and rear holders 70*a* and 70*b*.

In order to improve this situation, it has also be proposed to provide a connector with rear holders through the steps of temporarily retaining and incorporating the rear holders 70*a* and 70*b* in the housing 52 simultaneously with the use of a mold shown in FIG. 19, and then taking the rear holders out of the mold.

A temporarily retaining mold 90 shown in FIG. 19 is formed with a front fixed mold (not shown), a first movable mold 92 that is moved vertically, a pair of second movable molds 93 and 93 that are moved laterally, and a pair of third movable molds 94 and 94 that are moved longitudinally.

The central housing 52 in FIG. 19 is molded inside the first and second movable molds 92 and 93. The rear holders 70*a* and 70*b* are molded outside the first movable mold 92, inside the second movable mold 93 and inside the third movable mold 94.

In other words, the housing 52 and the rear holders 70*a* and 70*b* are formed in such a condition that the fixed and the movable molds have been joined together and then the first movable mold 92 is pulled up and subsequently the second movable molds 93 and 93 are separated laterally. Consequently, a space is produced between the rear holders 70*a* and 70*b* and the housing 52, and the third movable molds 94 and 94 are moved in the direction of the housing. Then the guide holes 72 of the rear holders 70*a* and 70*b* are retained by the guide rails 54 of the housing 52, and the rear holders 70*a* and 70*b* are temporarily retained by the housing 52. Further, the third movable molds 94 are separated from the housing 52, whereby the housing 52 in which the rear holders 70*a* and 70*b* have been retained temporarily is taken out of the temporarily retaining mold 90.

In the connector 51 with the related rear holders, high dimensional precision is required during the molding process to have the slot-like guide holes 72 respectively retained by the guide rails 54 and the regularly retaining projections 55 so as to have the rear holders 70*a* and 70*b* temporarily and regularly retained in the housing 52. Therefore, the retaining operation above is problematical as it has resulted in not only lowering productivity but also increasing the production cost.

Another problem is that the molding structure becomes complicated because it is necessary for the first movable mold 92 of the temporarily retaining mold 90 to move vertically, for the second movable molds 93 to move laterally and moreover for the third movable molds 94 to move longitudinally.

SUMMARY OF THE INVENTION

An object of the present invention made in view of the foregoing problems is to provide an inexpensive connector with rear holders requiring no high dimensional precision in particular for the rear holders to be molded during molding operation for which employable movable molds need less moving.

The foregoing problems can be solved by a connector with rear holders according to the invention as described in the following items 1) to 3)

1) A connector comprising:

a housing;

a plurality of terminal housing chambers for respectively housing connecting terminals provided at the housing;

a rear holder adapted to be retained at a temporarily retaining position of the housing which the connecting terminals are respectively housed in the plurality of terminal housing chambers and a regularly retaining position of the housing which the connecting terminals are respectively retained in the plurality of terminal housing chambers;

a retaining hole provided at inside the rear holder;

a retaining pawl having a tilting face provided at inside the rear holder;

a temporarily retaining projection having a tapered surface engaged with the retaining hole provided at the housing;

a tapered retaining step engaged with the retaining pawl provided at the housing; and a contact face tilted forwardly downwardly for guiding the rear holder provided at the housing, wherein the rear holder is pivoted by contacting the temporarily retaining projection and the retaining step before the rear holder is retained in the temporarily retaining position.

2) A method of manufacturing a connector including a housing having a plurality of terminal housing chambers, and a rear holder adapted to be retained at a temporarily retaining position of the housing which connecting terminals are respectively housed in the plurality of terminal housing chambers and a regularly retaining position of the housing which the connecting terminals are respectively retained in the plurality of terminal housing chambers, the method comprising the steps of:

providing a temporarily retaining mold for molding and temporarily retaining the housing and the rear holder, the temporarily retaining mold including a fixed mold and a plurality of movable mold movable with respect to the fixed mold;

molding the housing and the rear holder in the temporarily retaining mold;

moving at least one the plurality of movable mold so that the rear holder are rotated with respect to the housing and retained at the temporarily retaining position.

3) a method of manufacturing a connector including a housing having a plurality of terminal housing chambers, and a rear holder adapted to be retained at a temporarily retaining position of the housing which connecting terminals are respectively housed in the plurality of terminal housing chambers and a regularly retaining position of the housing which the connecting terminals are respectively retained in the plurality of terminal housing chambers, the method comprising the steps of:

providing a temporarily retaining mold for molding and temporarily retaining the housing and the rear holder, the temporarily retaining mold including a fixed mold, a first movable mold for molding an outer shell of the housing and an inner shell of the rear holder, a second movable mold for movably supporting the first movable mold in an axial direction, a third movable mold for molding an outer shell of the rear holder, and a forth movable mold for molding and retaining a central portion of the housing;

molding the housing and the rear holder in the temporarily retaining mold;

separating the second movable mold from the fixed mold;

moving the first movable mold with respect to the second movable mold and the housing so that the fourth movable mold partially retains the housing;

moving the third movable mold to a space which produced inside the third movable mold so that the rear holder are rotated with respect to the housing and retained at the temporarily retaining position.

In the connector with the rear holders thus arranged as described above, one of the rear holders includes the retaining hole and the retaining pawl having the stooping face inside the side piece of the rear holder; the temporarily retaining projection engaged with the retaining hole and having the tapered surface over its whole surface is provided on the side of the rear end portion of the housing, and the tapered retaining step engaged with the retaining pawl is provided in the vicinity of the temporarily retaining projection; the stooping contact face for guiding the rear holder is provided on the surface of the rear end portion of the housing; and the rear holders both are pivoted by respectively contacting the temporarily retaining projections and the retaining steps before being temporarily retained.

Therefore, the rear holders are temporarily retained in the housing while being pivoted when the retaining holes and the retaining pawls of the rear holders are brought into contact with the respective temporarily retaining projections and the retaining steps of the housing and when the undersurfaces of the rear holders are brought into contact with the contact faces. In other words, as the retaining step and the contact face are pivoted on a relatively long slope, no high dimensional precision is essential, which makes it possible to not only improve productivity but also obtain an inexpensive connector with rear holders.

In the method of producing a connector with rear holders thus arranged as described above, the temporarily retaining mold for molding and temporarily retaining the housing and the rear holders includes the fixed mold and the plurality of movable molds which are movable with respect to the fixed mold; and after the housing and the rear holders are molded in the molds, the rear holders are pivoted and temporarily retained when at least one of the movable molds or part of the mold is subjected to parallel movement.

Therefore, as the rear holders are pivoted and temporarily retained only when part of the movable mold is moved, a relatively simple structure and a driving method can be adopted, which makes it possible to not only improve productivity but also obtain an inexpensive connector with rear holders.

In the method of producing a connector with rear holders thus arranged as described above, the temporarily retaining mold for molding and temporarily retaining the housing and the rear holders includes the fixed mold, the first movable mold for forming the outer shell of the housing and the inner shells of the rear holders, the second movable molds for movably supporting the first movable mold in the axial direction of the housing, the third movable molds for forming the outer shells of the rear holders, and the fourth movable mold for forming and holding the central portion of the housing; and after the housing and the rear holders are molded in the mold, the second movable molds are estranged from the fixed mold and the first movable mold is moved back up to a position where the first movable mold holds the rear end portion of the housing, and the third movable molds are moved into the space produced inside the third movable molds, whereby the retaining holes of the rear holders are mated with the respective temporarily retaining projections; the rear holders are pivoted stoopingly on the temporarily retaining projections; the retaining pawls are mated with the retaining steps; and simultaneously the undersurfaces of the respective rear holders are brought into contact with the contact faces, so that the rear holders are temporarily retained in the housing.

Therefore, as the first, second and fourth movable molds can be moved laterally only by vertically moving the third movable molds, a relatively simple structure and a driving method can be adopted, which makes it possible to not only improve productivity but also obtain an inexpensive connector with rear holders.

DETAILED DESCRIPTION OF PREFERRED EMBODIMENT

Figure 1:
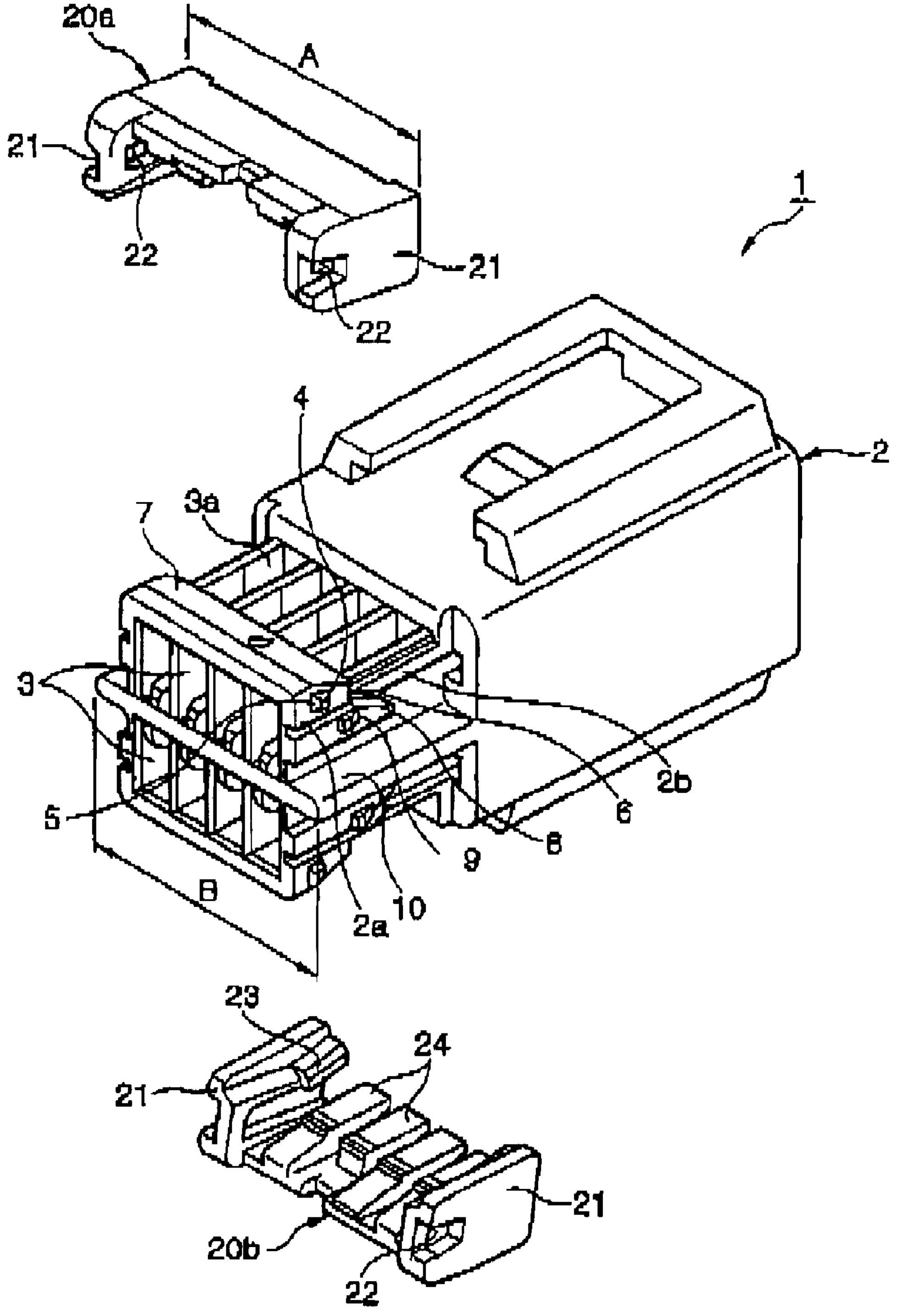
FIG. 1 is an exploded perspective view of a female connector with rear holders as an embodiment of the invention.
Figure 2:
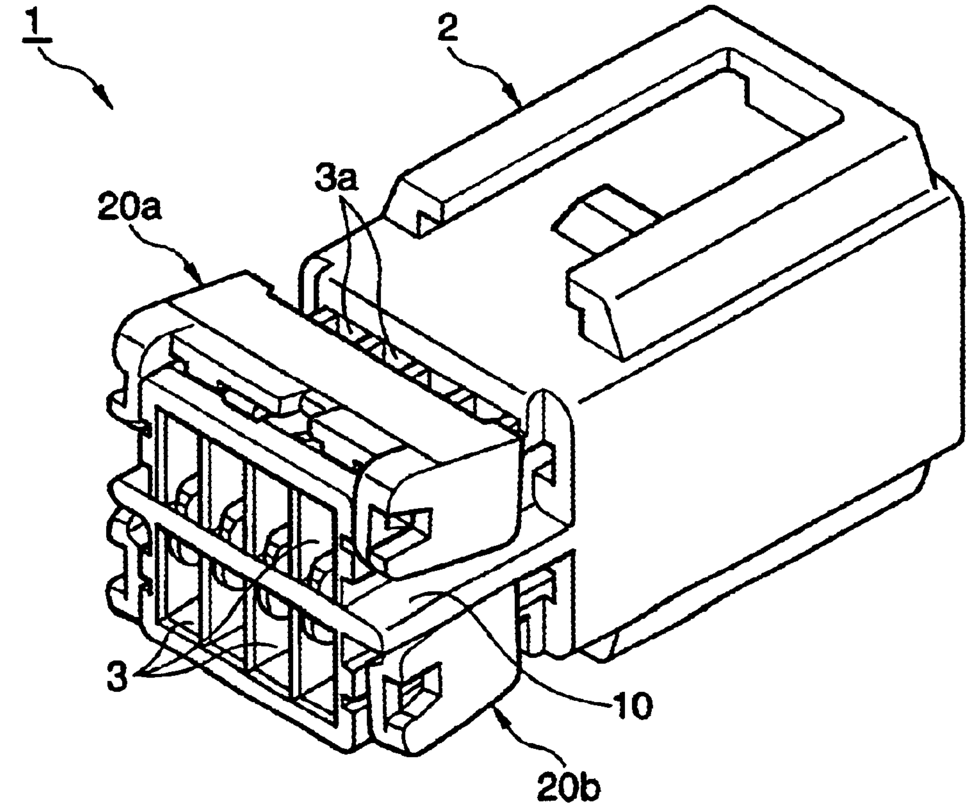
FIG. 2 is a perspective view of the rear holders in FIG. 1 in a temporarily retained condition.
Figure 3:
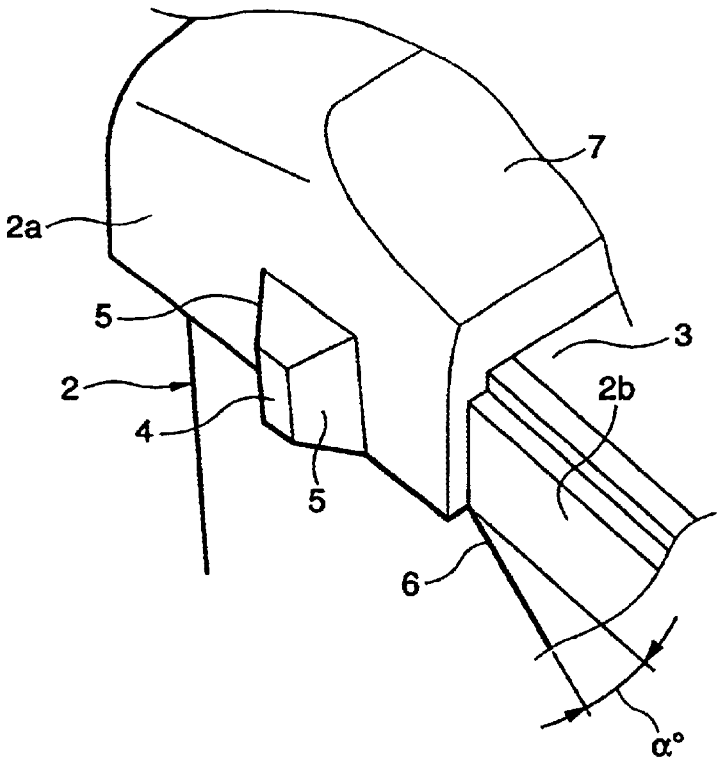
FIG. 3 is a partially enlarged perspective view of the temporarily retained projection of the housing in FIG. 1.
Figure 4:
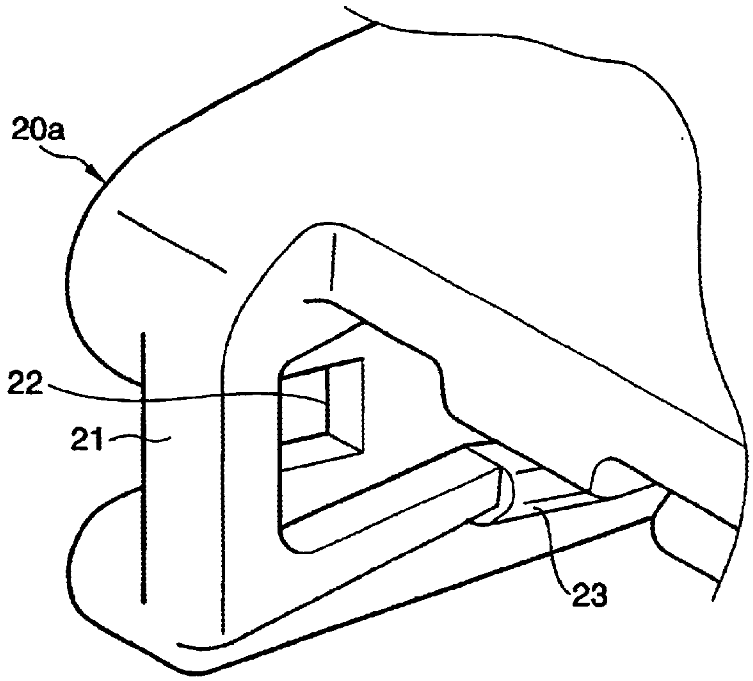
FIG. 4 is a partially enlarged perspective view of the side piece portion of the rear holder in FIG. 1.
Figure 5:
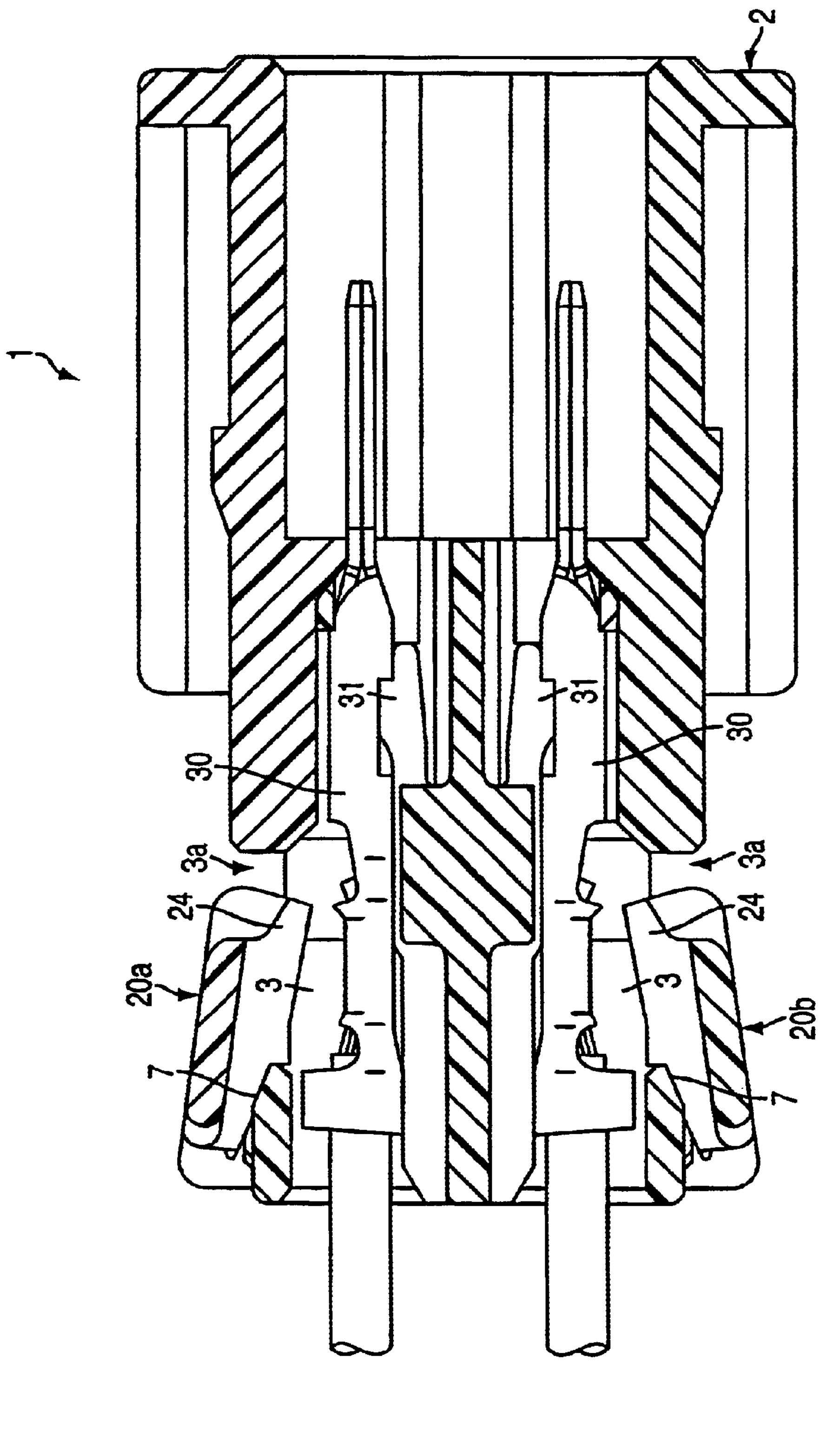
FIG. 5 is a sectional view of the rear holders in FIG. 1 in a temporarily retained condition.
Figure 6:
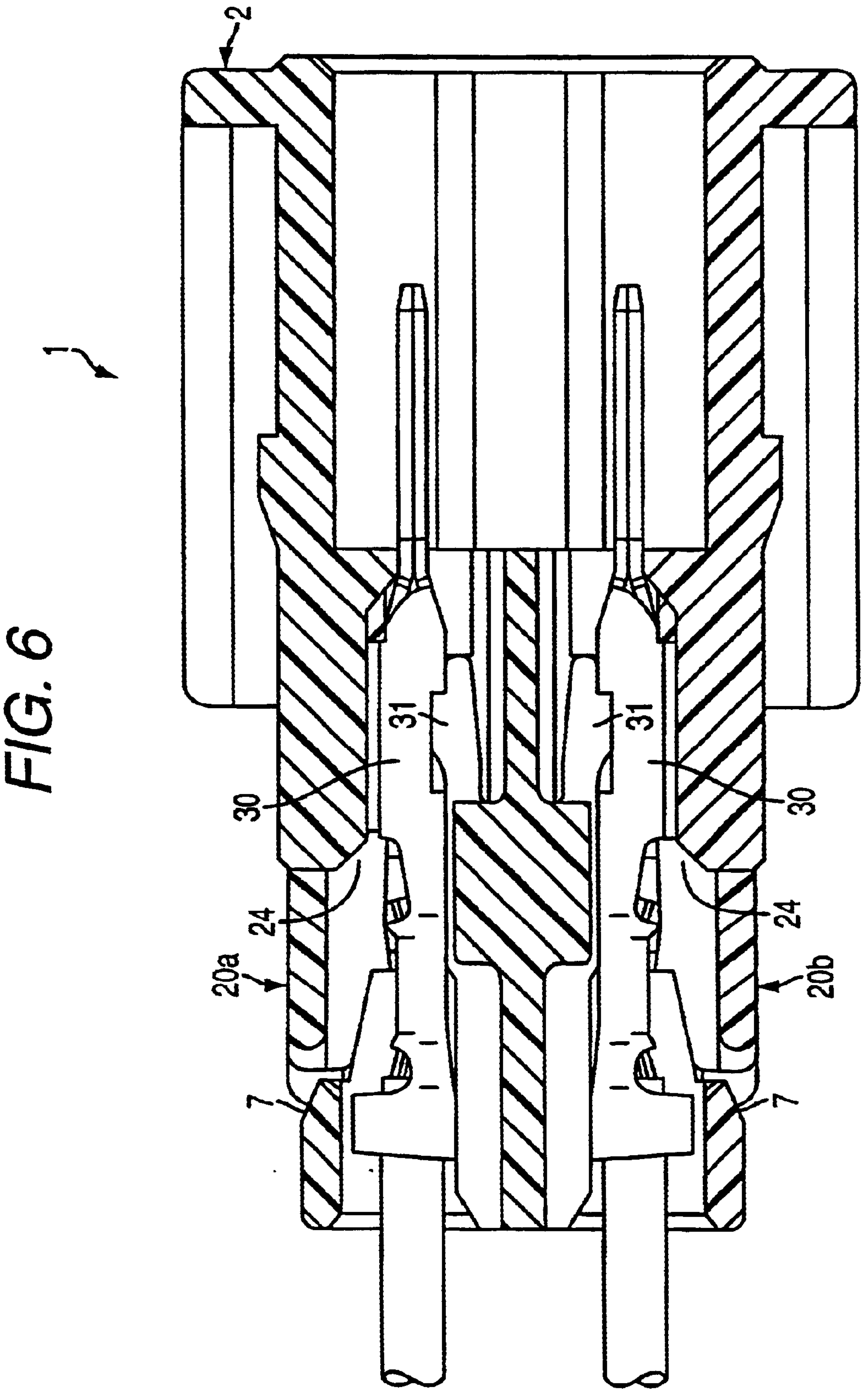
FIG. 6 is a sectional view of the rear holders in FIG. 1 in a regularly retained condition.
Figure 7:
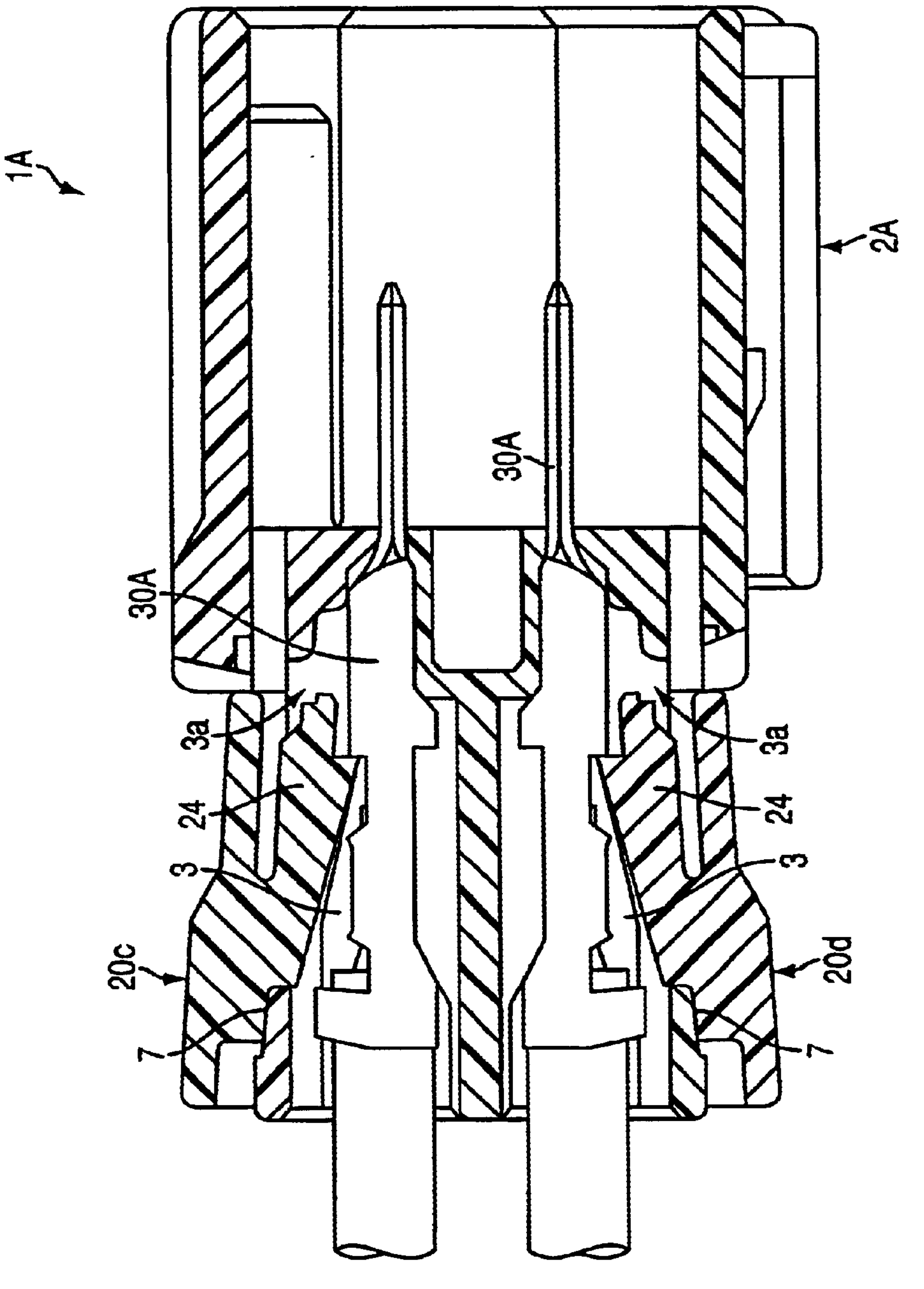
FIG. 7 is a sectional view of rear holders in a temporarily retained condition as another embodiment of the invention.
Figure 8:
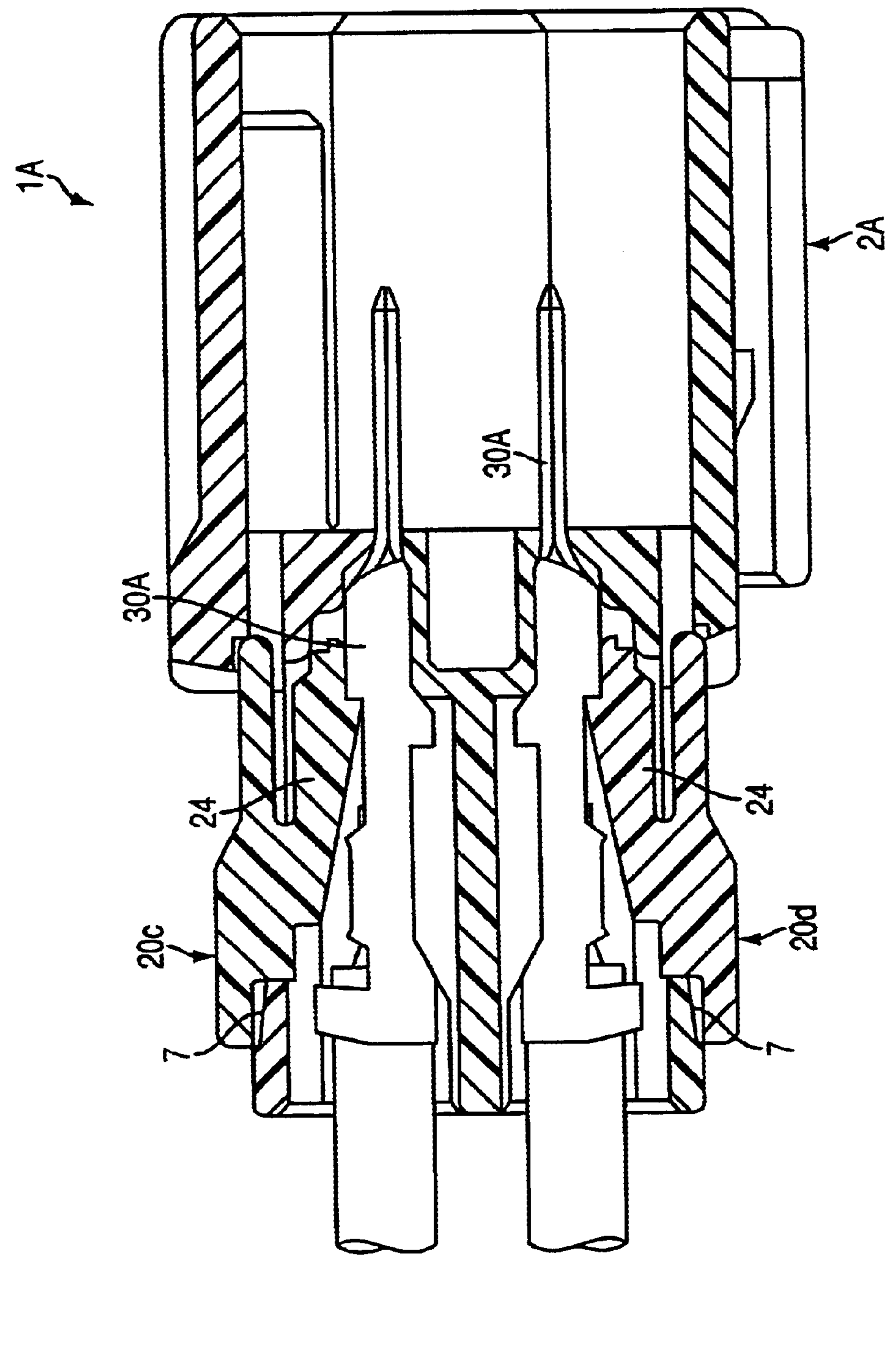
FIG. 8 is a sectional view of the rear holders in FIG. 7 in a regularly retained condition.

A connector having rear holders embodying the present invention will now be described in detail with reference to FIGS. 1 to 11. FIG. 1 is an exploded perspective view of a female connector having rear holders as an embodiment of the invention. FIG. 2 is a perspective view of the rear holders in FIG. 1 in a temporarily retained condition. FIG. 3 is a partially enlarged perspective view of the temporarily retained projection of the housing in FIG. 1. FIG. 4 is a partially enlarged perspective view of the side piece portion of the rear holder in. FIG. 1. FIG. 5 is a sectional view of the rear holders in FIG. 1 in a temporarily retained condition. FIG. 6 is a sectional view of the rear holders in FIG. 1 in a regularly retained condition. FIG. 7 is a sectional view of rear holders in a temporarily retained condition as another embodiment of the invention. FIG. 8 is a sectional view of the rear holders in FIG. 7 in a regularly retained condition.

Figure 9:
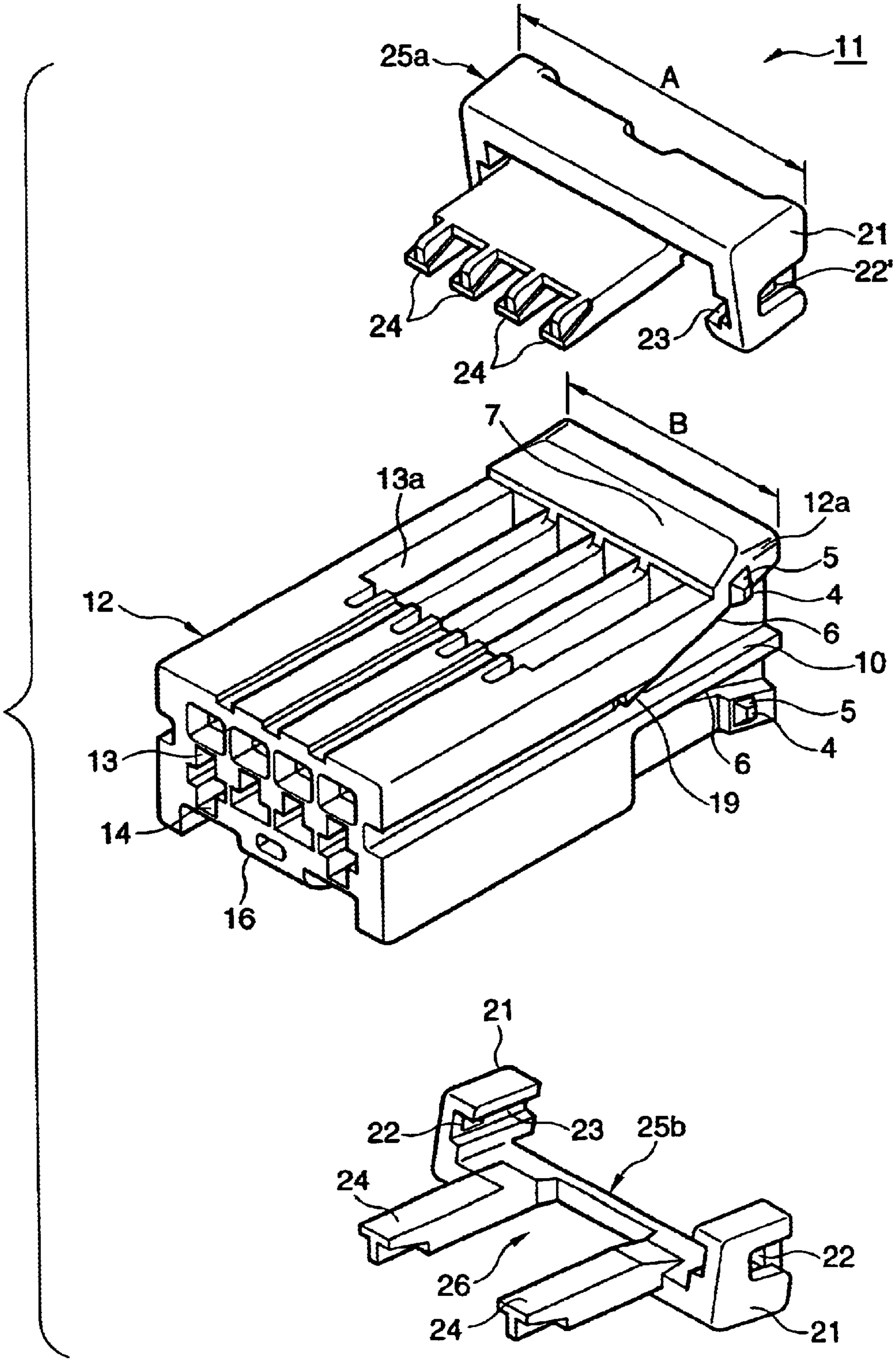
FIG. 9 is an exploded perspective view of a male connector with rear holders embodying the invention.
Figure 10:
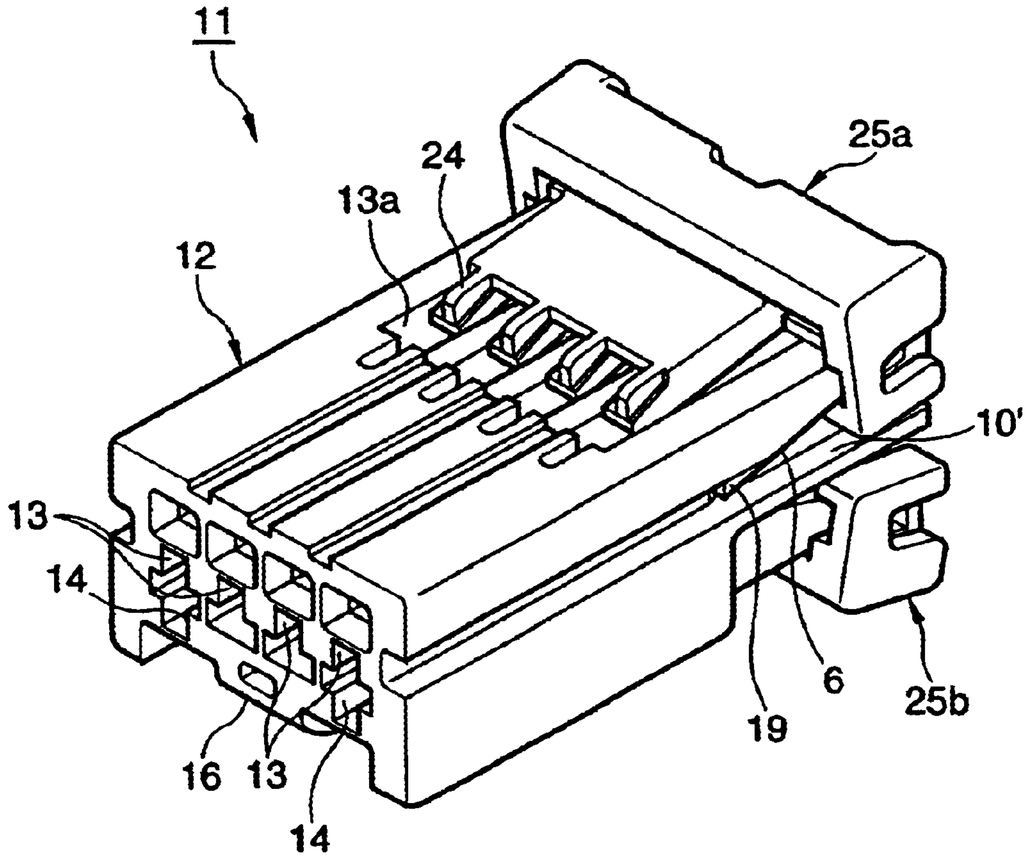
FIG. 10 is a perspective view of the rear holders in FIG. 9 in a temporarily retained condition.
Figure 11:
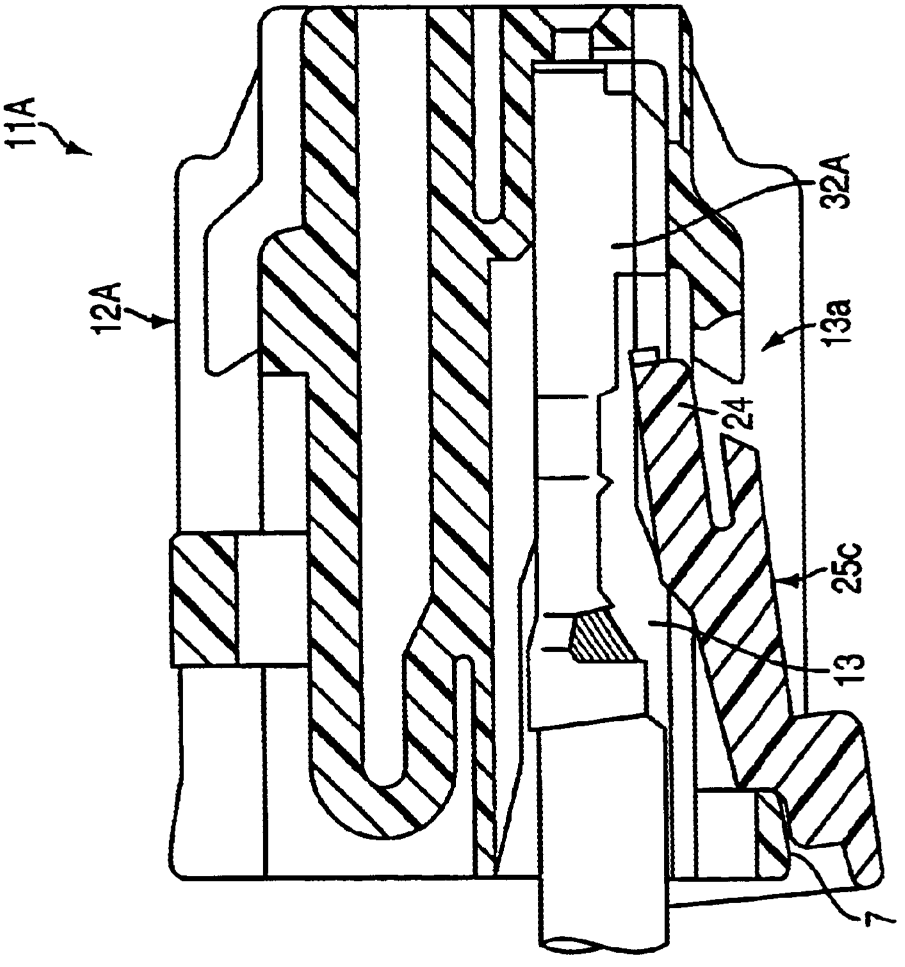
FIG. 11 is a sectional view of rear holders in a temporarily retained condition as still another embodiment of the invention.
Figure 12:
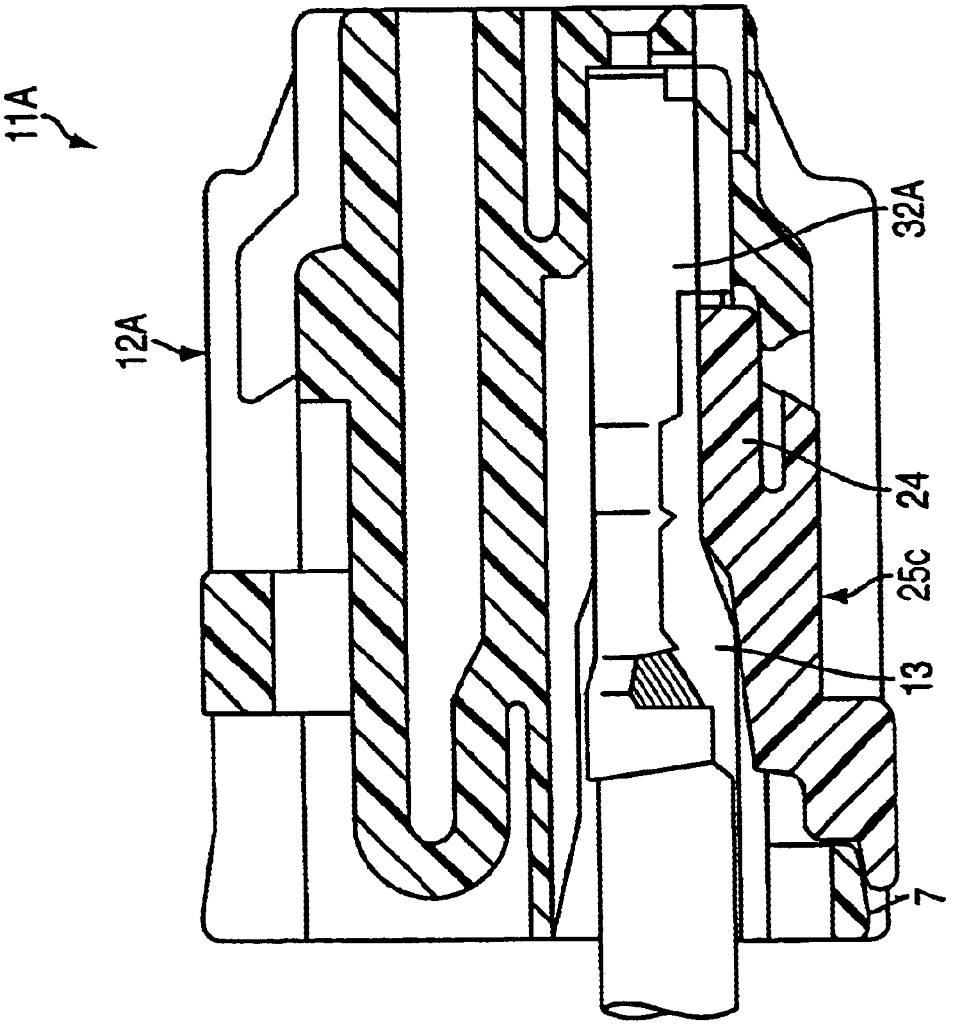
FIG. 12 is a sectional view of the rear holders in FIG. 11 in a regularly retained condition.
Figure 13:
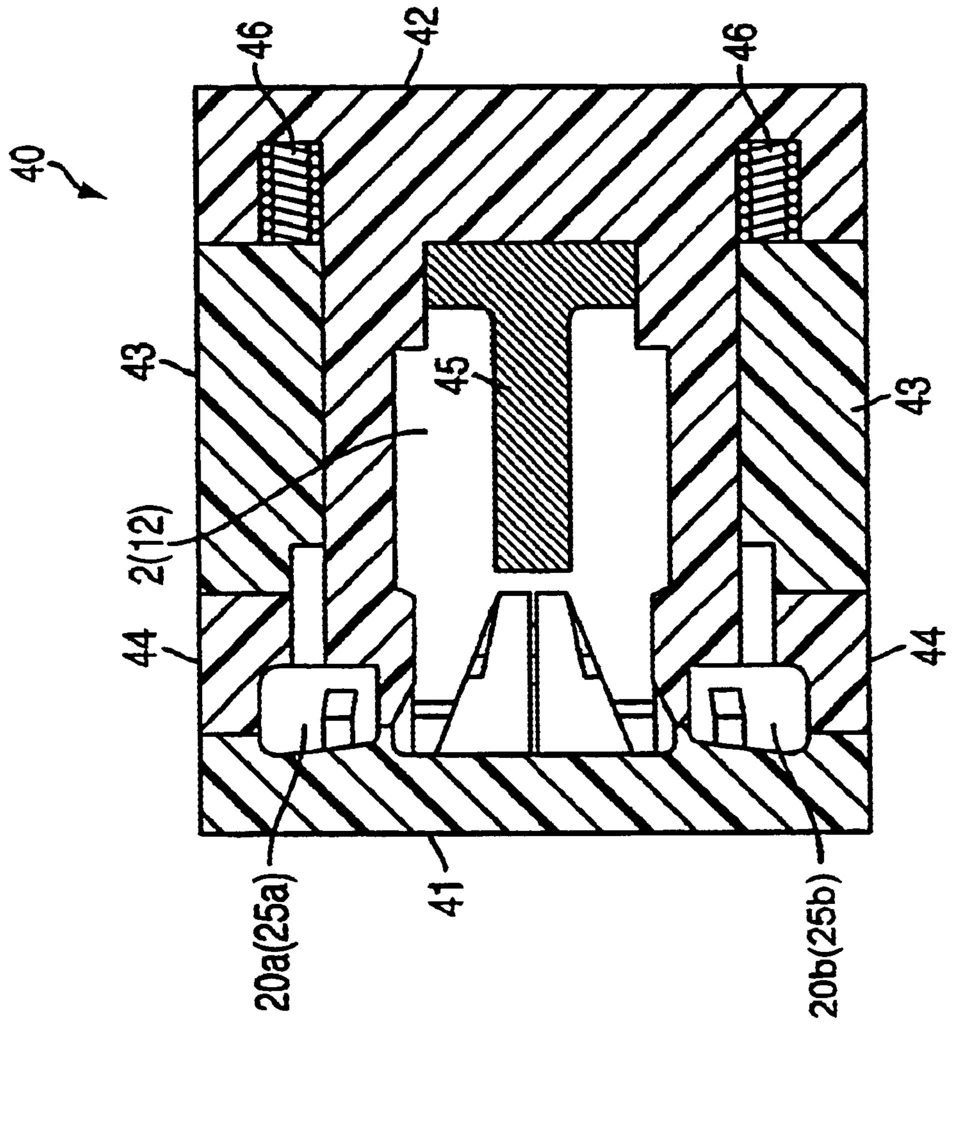
FIG. 13 is a sectional view of a temporarily retaining mold for molding the connector with the rear holders during the process of injection molding.
Figure 14:
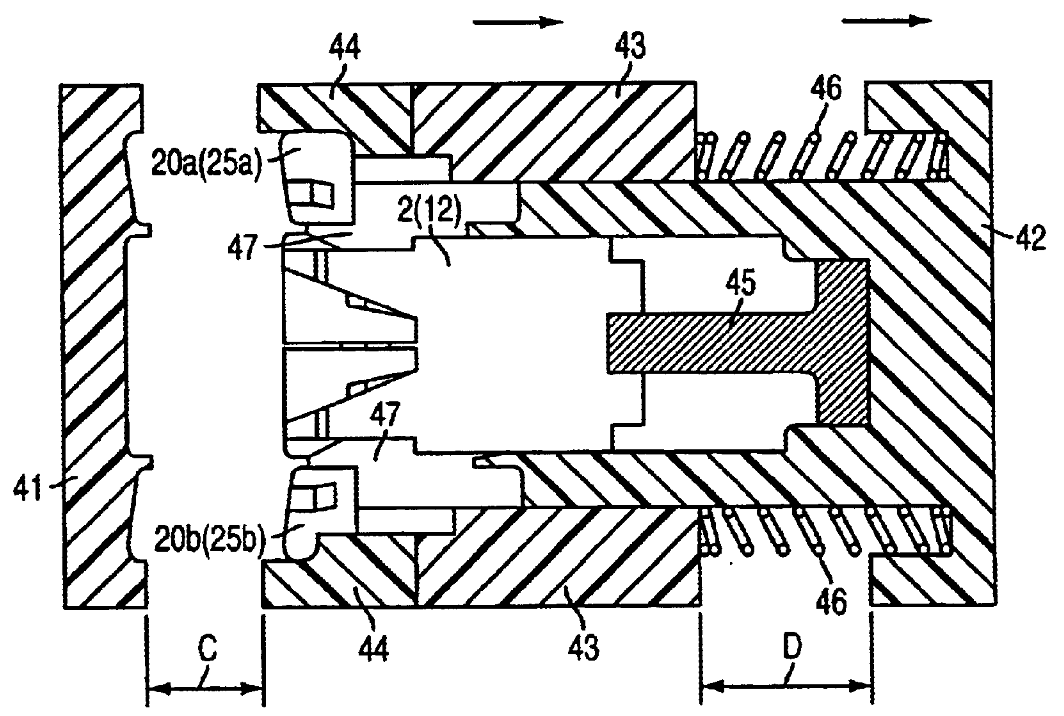
FIG. 14 is a sectional view of the temporarily retaining mold in FIG. 13 in its partially moved condition.
Figure 15:
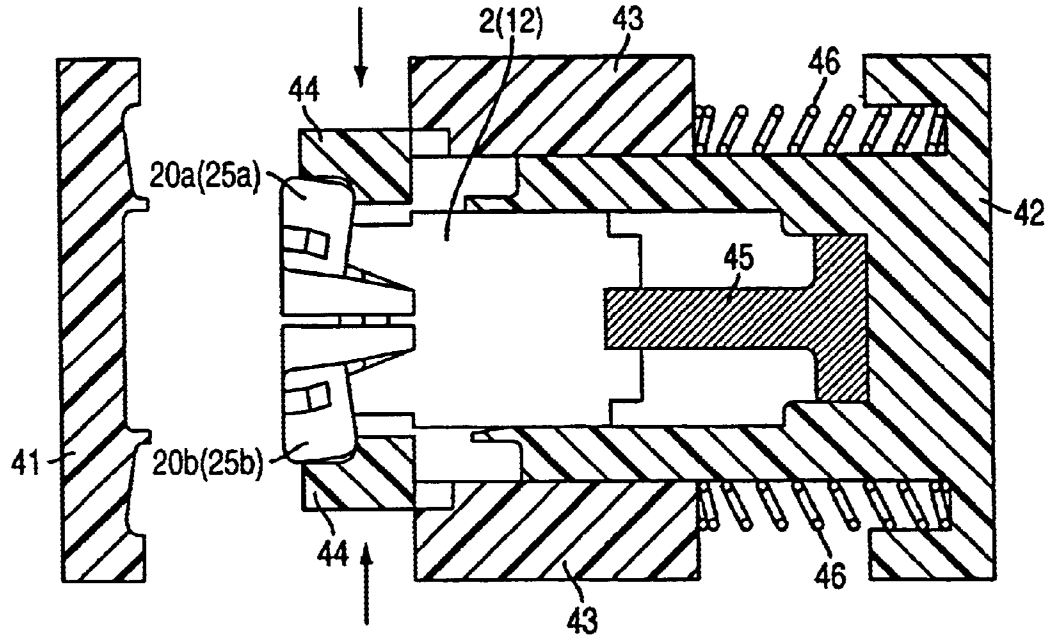
FIG. 15 is a sectional view of the rear holders temporarily retained in the housing by the third movable molds in FIG. 13.
Figure 16:
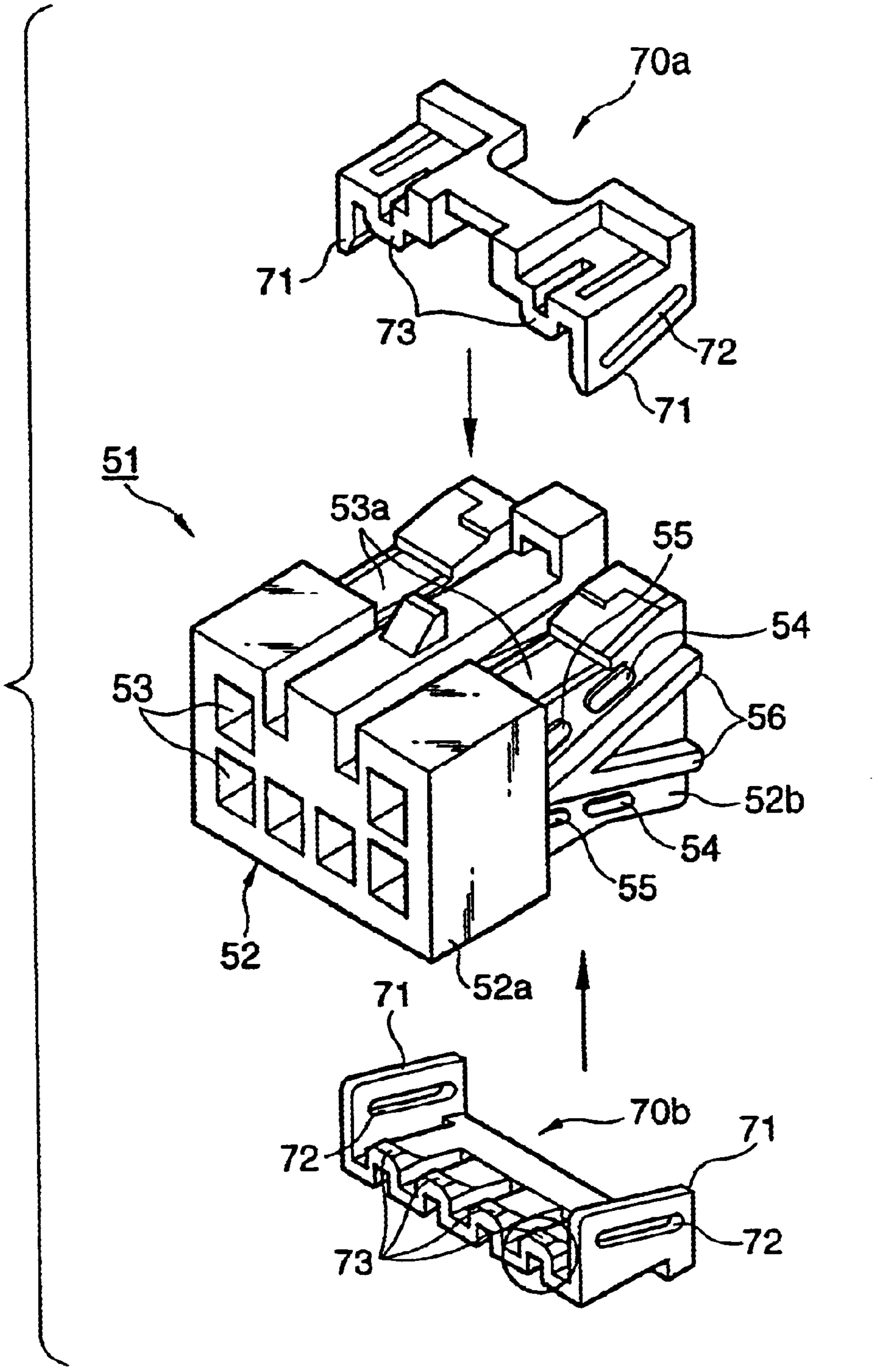
FIG. 16 PRIOR ART
FIG. 16 is an exploded perspective view of a connector with conventional rear holders by way of example.
Figure 17:
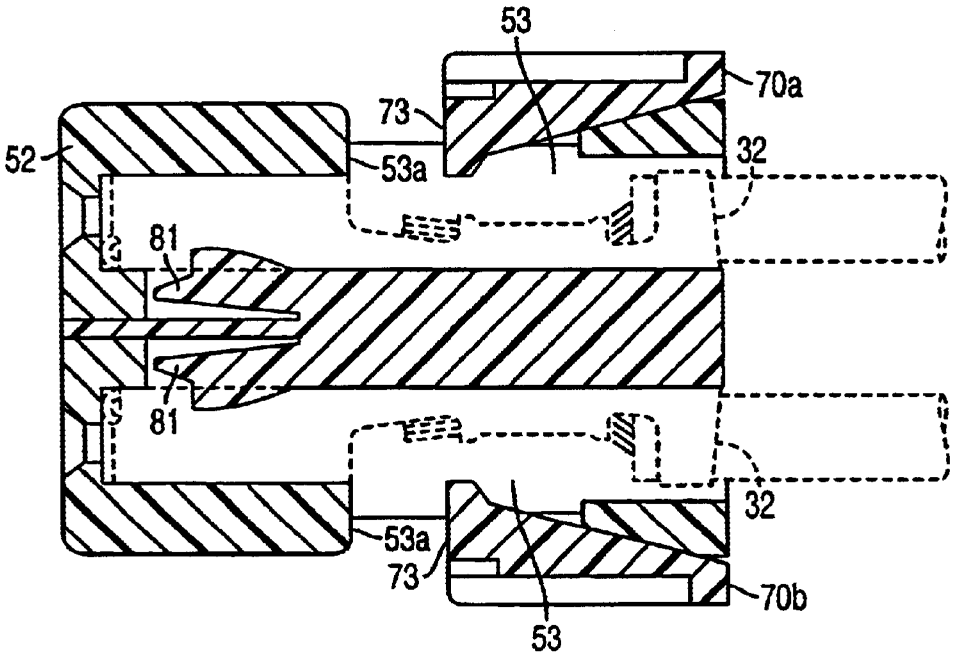
FIG. 17 PRIOR ART
FIG. 17 is a sectional view of the rear holders in FIG. 16 in a temporarily retaining condition.
Figure 18:
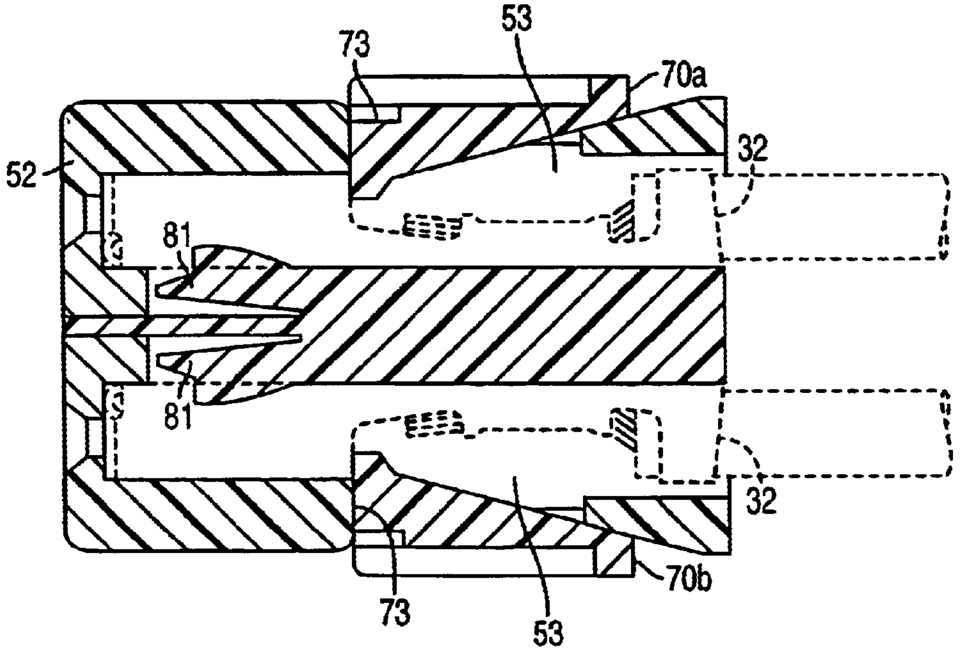
FIG. 18 PRIOR ART
FIG. 18 is a sectional view of the rear holders in FIG. 16 in a regularly retaining condition.
Figure 19:
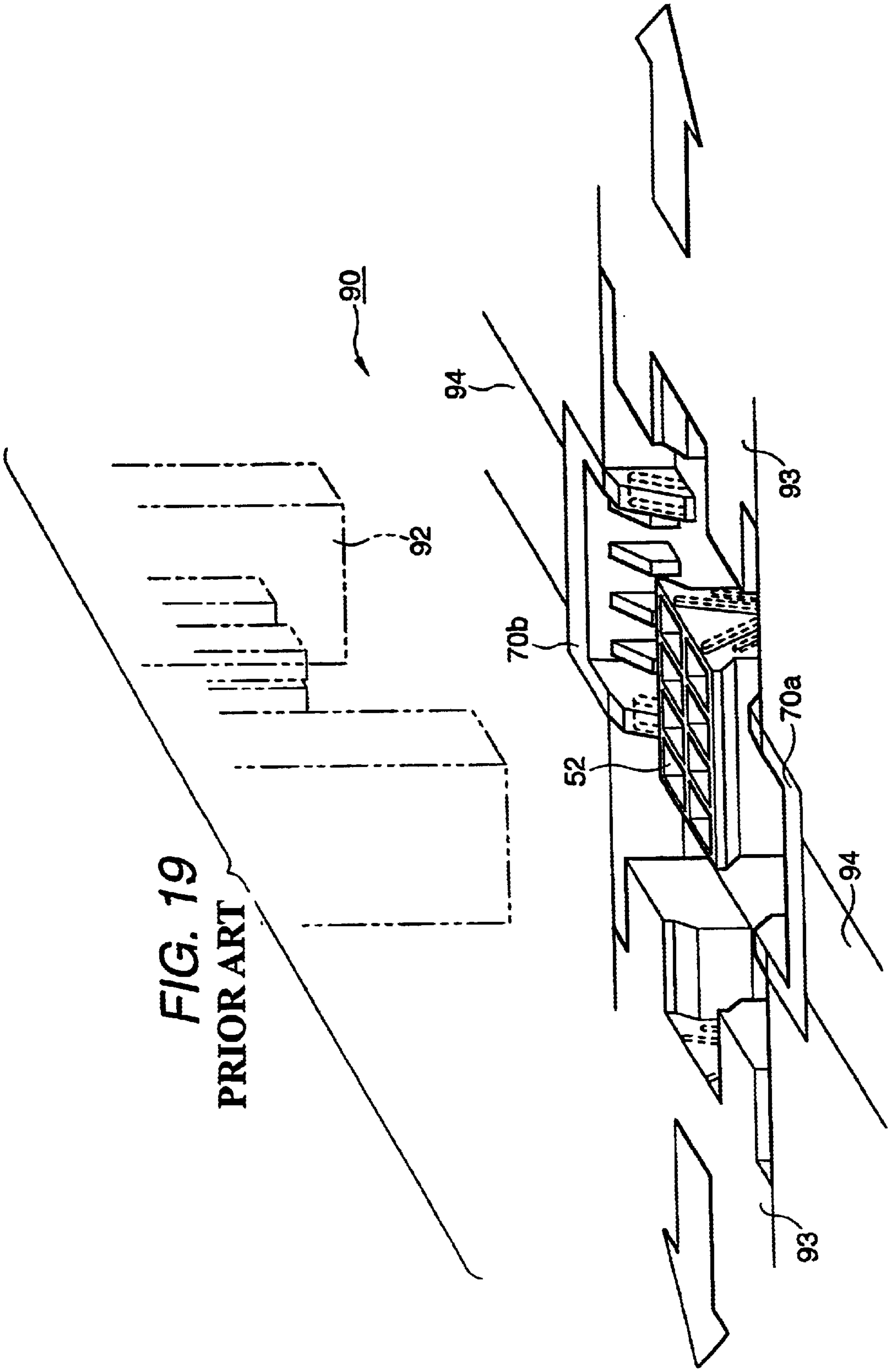
FIG. 19 PRIOR ART
FIG. 19 is a partial perspective view of a mold for temporarily retaining the rear holders in a housing after the connector with the rear holders in FIG. 16 is molded.

FIG. 9 is an exploded perspective view of a male connector with rear holders embodying the invention. FIG. 10 is a perspective view of the rear holders in FIG. 9 in a temporarily retained condition. FIG. 11 is a sectional view of rear holders in a temporarily retained condition as still another embodiment of the invention. FIG. 12 is a sectional view of the rear holders in FIG. 11 in a regularly retained condition. FIG. 13 is a sectional view of a temporarily retaining mold for molding the connector with the rear holders in FIGS. 1 to 12 during the process of injection molding. FIG. 14 is a sectional view of the temporarily retaining mold in FIG. 13 in its partially moved condition. FIG. 15 is a sectional view of the rear holders temporarily retained in the housing by the third movable molds in FIG. 13.

First, a female connector with rear holders according to the invention will be described in detail with reference to FIGS. 1 to 6.

As shown in FIG. 1, a female connector 1 having rear holders includes: a housing 2 having a plurality of terminal housing chambers 3; a rear holder 20*a* on the upper side of FIG. 1; a rear holder 20*b* on the lower side thereof; and a plurality of connecting terminals 30 to be inserted into the respective terminal housing chambers 3 (see FIG. 5). The rear holders 20*a* and 20*b* being temporarily and regularly retained in such a manner as to be laid across opposite side portions of the housing 2.

More specifically, as shown in FIGS. 1, 3 and 4, a retaining hole 22 and a retaining pawl 23 having a forwardly and downwardly tilting face 23 are provided inside the side piece 21 of each of the rear holders 20*a* and 20*b*. A temporarily retaining projections 4 engaged with the retaining hole 22 and having a tapered surface 5 over the whole of its surface are provided on the opposite sides 2*a* of the rear end portion of the housing 2.

A tapered retaining step 6 engaged with the retaining pawl 23 and tilting by an angle of a forwardly and downwardly with respect to the horizontal plane is provided on the side 2*b* that is continuous to the side 2*a* of the rear end portion above. Moreover, a contact face 7 that tilts forwardly and downwardly and is used to hold and guide the undersurfaces of the rear holders 20*a* and 20*b* is provided on the surface of the rear end portion of the housing 2.

A guide rail 8 in parallel to the retaining step 6 is provided below the retaining step. A regularly retaining projection 19 as a regularly retaining means is provided on the side the guide rail. A protective rib 10 having a width B is provided between the upper and lower terminal housing chambers 3 and 3 corresponding to the rear holders 20*a* and 20*b* as shown in FIG. 1. The width B is set greater than the width A of the rear holders 20*a* and 20*b* to prevent the rear holders 20*a* and 20*b* temporarily retained by the housing 2 within the mold from releasing and dropping from the mold.

In the connector 1 having the rear holders thus arranged, the retaining holes 22 are engaged with the respective temporarily retaining projections 4 when the rear holders 20*a* and 20*b* are pressed by movable molds as described later against the rear portion of the housing 2 formed in the temporarily retaining mold. At this time, the rear holders 20*a* and 20*b* are pivoted forward on the temporarily retaining projections 4. The retaining pawls 23 are engaged with the respective retaining steps 6. The undersurfaces of the rear holders 20*a* and 20*b* are brought into contact with the contact face 7. Whereby the rear holders 20*a* and 20*b* are temporarily retained in the housing 2 as shown in FIG. 2.

A procedure for incorporating connecting terminals 30 into the connector 1 with the rear holders according to this embodiment of the invention is described as following. The rear holders 20*a* and 20*b* are held in a temporarily retaining position. The connecting terminals 30 are inserted into the terminal housing chamber 3 from the rear end of the housing so that the connecting terminals 30 are retained in the terminal housing chamber 3 by housing lances 31. Then, the retaining pawls 23 are guided to the retaining steps 6 while the undersurfaces of the rear holders 20*a* and 20*b* are guided by the contact face 7 and moved forwardly due to pushing the rear holders 20*a* and 20*b* forwardly. Therefore, the retaining holes 22 are retained by a regularly retaining projection 9. At this time, the secondary retaining projections 24 of the rear holders 20*a* and 20*b* are allowed to enter openings 3*a* from the intermediate portion of the terminal housing chambers 3, whereby the connecting terminals 30 are doubly retained therein as shown in FIG. 6.

In the connector 1 having the rear holders as described above according to this embodiment of the invention, the retaining hole 22 and the retaining pawl 23 having the forwardly downwardly tilting face 23 are provided inside the side piece 21 of each of the rear holders 20*a* and 20*b*. The temporarily retaining projection 4 engaged with the retaining hole 22 and having the tapered surface 5 over the whole of its surface is provided on the side 2*a* of the rear end portion of the housing 2. The tapered retaining step 6 engaged with the retaining pawl 23 is provided on the side 2*b* that is continuous to the side 2*a* of the rear end portion above. The contact face 7 tilting forwardly and downwardly for holding and guiding the undersurfaces of the rear holders 20*a* and 20*b* is provided on the surface of the rear end portion of the housing 2.

In order to temporarily retain the rear holders 20*a* and 20*b* in the housing 2, the retaining holes 22 are respectively mated with the temporarily retaining projections 4, and the rear holders 20*a* and 20*b* are pivoted. Therefore, the retaining pawls 23 are engaged with the respective retaining steps 6, and the undersurfaces of the rear holders 20*a* and 20*b* are brought into contact with the contact face 7 with the effect of temporarily retaining the rear holders 20*a* and 20*b*. In other words, as each of the retaining step 6 and the contact face 7 has a relatively long slope with the rear holders 20*a* and 20*b* being pivoted thereon, no high dimensional precision is essential, which makes it possible to not only improve productivity but also obtain an inexpensive connector with rear holders.

Although the female connector with the rear holders described above is in such a form that the connecting terminals 30 are doubly retained by the rear holders 20*a* and 20*b* according to this embodiment of the invention, the invention is also applicable to a connector with rear holders without housing lances wherein connecting terminals are retained only by rear holders in terminal housing chambers.

More specifically, in order to incorporate connecting terminals 30A into a connector 1A with rear holders, the connecting terminals 30A are inserted from the rear end of a housing 2A after rear holders 20*c* and 20*d* are held in a temporarily retained condition in the respective openings 3*a* in the side wall of the housing 2A as shown in FIG. 7. When the rear holders 20*c* and 20*d* are pushed forward as shown in FIG. 8 while being guided by the contact faces 7, the connecting terminals are moved forward and downward before being regularly retained in the respective terminal housing chambers 3 and further retained by part of the retaining projection 24 of each of the rear holders 20*c* and 20*d* to prevent the connecting terminals 30A from slipping off backward.

A male connector with rear holders embodying the invention will be described with reference to FIGS. 9 and 10. Like reference characters in a connector 11 with rear holders designate like component parts of the aforementioned connector 1 with the rear holders and the detail description thereof will be omitted.

As shown in FIG. 9, the male connector 11 with rear holders includes: a housing 12 having a plurality of terminal housing chambers 13 and 14; rear holders 25*a* and 25*b* to be temporarily retained in such a manner to be laid vertically across both side portions of the housing; and a plurality of terminal housing chambers 30 to be inserted into the respective terminal housing chambers 13 and 14 (see FIG. 5).

Openings 13*a* where the front end portion of the rear holder 25*a* enters are provided in the intermediate portion of the terminal housing chamber 13 on one side of the housing 12. Openings (not shown) are provided in the intermediate portion of the other terminal housing chamber 14.

The terminal housing chambers 13 of the upper-stage housing 12 are provided over its whole width (four of them in FIG. 9). Only two terminal housing chambers 14 (as shown in FIG. 9) of the lower-stage are provided in opposite sides of the housing because the fitting lock means 16 is provided on the central portion of the lower-stage housing.

Four of the secondary retaining projections 24 are provided to one rear holder 25*a* to prevent the connecting terminals from being doubly retained. Two of the secondary retaining projection 24 are respectively provided on opposite ends of the other rear holder 25*b* due to a space 26 being provided in the central portion to prevent interference with the fitting lock means 16.

A regular retaining step 19 as a regularly retaining means for regularly retaining the rear holders 25*a* and 25*b* in the housing 12 is provided on the front side of each retaining step 6. Since the tilting angle of the regularly retaining step 19 becomes parallel to the axis as shown in FIG. 6 when the rear holders 25*a* and 25*b* are regularly retained, that angle is set smaller than the tilting angle $\alpha°$ of the retaining step 6. As the rest of the arrangement and the operation/working-effect are similar to those of the connector 1 with the rear holders described above, the description thereof will be omitted.

The male connector 11 having the rear holders according to the above embodiment of the invention is in the form of doubly retaining the connecting terminals by the rear holders 25*a* and 25*b*, the invention is also applicable to a connector with rear holders without housing lances wherein connecting terminals are retained only by rear holders in terminal housing chambers.

In order to incorporate a female connecting terminal 32A into a connector 11A with rear holders, the connecting terminal 32A is inserted from the rear end of a housing 12A after a rear holder 25*c* is held in a temporarily retained condition in the opening 13*a* in the side wall of the housing 12A as shown in FIG. 11. When the rear holder 25*c* is pushed forward as shown in FIG. 12 while being guided by the contact face 7, the connecting terminal is moved forward downwardly before being regularly retained in the terminal housing chamber 13 and the front end portion of the retaining projection of the rear holder 25*c* prevents the connecting terminal 32A from slipping off backward.

A method of manufacturing a connector with rear holders embodying the invention will be described in detail with reference to FIGS. 13 to 15.

As shown in FIG. 13, a temporarily retaining mold 40 for molding the housings 2 and 12 and the rear holders 20*a*, 20*b*, 25*a* and 25*b* includes a fixed mold having a gate (not shown). A plurality of movable molds 42, 43, 44 and 45 that are movable with respect to the fixed mold 41.

The movable molds include: a first mold 42 for forming the outer shells of the housings 2 and 12 and the inner shells of the rear holders 20*a*, 20*b*, 25*a* and 25*b* and for supporting a fourth movable mold (as will be described below); second movable molds 43 for supporting the first movable mold 42 movably in the axial direction of the housing and for supporting third movable molds (as will be described below) movably in a direction perpendicular to the axial direction thereof; the third movable molds 44 for forming the outer shells of the rear holders 20*a*, 20*b*, 25*a* and 25*b*; and the fourth movable mold 45 for forming and holding the central portions of the housings 2 and 12. In this case, compression springs 46 are provided between the first and second movable molds 42 and 43, so that the molds 42 and 43 are separated from each other by a distance of D or pushed and brought into contact with each other.

While the fixed mold 41 and the movable molds 42, 43, 44 and 45 are joined together as shown in FIG. 13, resin material is injected through the gate (not shown) whereby to mold the housings 2 and 12 and the rear holders 20*a*, 20*b*, 25*a* and 25*b* within the mold.

Subsequently, the movable molds 42, 43, 44 and 45 are separated from the fixed mold 41 by a gap of C as shown in FIG. 14 and simultaneously the first movable mold 42 is moved back by the compression springs 46 up to a position where the rear end portions of the molded housings 2 and 12 are held by the fourth movable mold 45, that is, by the distance of D.

The third movable mold 44 is moved into the space 47 produced in the third movable mold 44 toward the housings 2 and 12 as shown in FIG. 15 and then retaining holes 22 of the molded rear holders 20*a*, 20*b*, 25*a* and 25*b* are mated with the respective temporarily retaining projections 4. At this time, the rear holders 20*a*, 20*b*, 25*a* and 25*b* are forwardly and downwardly pivoted on the temporarily retaining projections 4. Then the retaining pawls 23 are mated with the retaining steps 6, and the undersurfaces of the rear holders are brought into contact with the contact faces 7, whereby the rear holders 20*a*, 20*b*, 25*a* and 25*b* are temporarily retained in the housings 2 and 12.

While the rear holders 20*a*, 20*b*, 25*a* and 25*b* are temporarily retained in the housings 2 and 12, the rear holders 20*a*, 20*b*, 25*a* and 25*b* are discharged from the temporarily retaining mold 40. As the protect ribs 10 having a width of B greater than the width A of the rear holders 20*a*, 20*b*, 25*a* and 25*b* are provided to the housings 2 and 12, the temporarily retained rear holders 20*a*, 20*b*, 25*a* and 25*b* are never removed from the housings 2 and 12 even though the rear holders are discharged and dropped from the mold.

In the temporarily retaining mold 40 according to this embodiment of the invention, as the first, second and fourth movable molds 42, 43 and 45 can be moved laterally only by vertically moving the third movable molds 44, it is possible to not only improve productivity but also obtain an inexpensive connector with rear holders that are relatively simple in structure.

Moreover, the driving structure and driving method of the temporarily retaining mold 40 is such that when the first movable mold 42, for example, is pressed by a fluid pressure cylinder or the like in the direction of the fixed mold 41, the closed condition of the mold is established as shown in FIG. 13. When the first movable mold 42 is moved by the fluid pressure cylinder in the direction of estranging it from the fixed mold 41, the urging force of the compression springs 46 causes the first movable mold 42 to be separated from the second movable molds 43 by the distance of D and the third movable molds 44 are also separated from the fixed mold 41 by the gap of C as shown in FIG. 14. Consequently, it is ensured to set the gap C and the like by providing stoppers on the guide rails for slidably holding the second movable molds 43.

Although such a fluid cylinder may be used to vertically drive the third movable molds 44 as shown in FIG. 15, the motion of the second movable molds 43 driven from the fixed mold 42 by the gap of C may also be utilized for readily driving the third movable molds with links or a cam mechanism. Therefore, as the temporarily retaining mold 40 is simpler in the structure and driving method than the related temporarily retaining mold 90, it is possible to not only improve productivity but also obtain an inexpensive connector with rear holders.

The connectors having the rear holders according to the invention are not limited to the aforementioned mode for carrying it out but may be implemented in any other mode. Although the direction in which the third movable molds 44 of the temporarily retaining mold 40 are driven has been vertical in the methods according to this embodiment of the invention, they pay be moved horizontally as long as they are movable in a direction perpendicular to the fitting axis of the housing.

As set forth above, the connector having the rear holders according to the invention is such that one of the rear holders includes: the retaining hole and the retaining pawl having the forwardly and downwardly tilting face inside the side piece of the rear holder; the temporarily retaining projection engaged with the retaining hole and having the tapered surface over the whole of its surface, the tapered retaining step engaged with the retaining pawl in the vicinity of the temporarily retaining projection; and the contact face that tilts forwardly and downwardly and is used to guide the rear holder on the surface of the rear end portion of the housing, so that when the rear holders are pivoted when the rear holders are brought into contact with the temporarily retaining projections and the retaining steps, the rear holders are temporarily retained in the housing.

Therefore, the rear holders are temporarily retained in the housing while being pivoted when the retaining holes and the retaining pawls of the rear holders are brought into contact with the respective temporarily retaining projections and the retaining steps of the housing and when the undersurfaces of the rear holders are brought into contact with the contact faces.

In the method of producing the connector with the rear holders according to the invention, the temporarily retaining mold for molding and temporarily retaining the housing and the rear holders includes the fixed mold and the plurality of movable molds which are movable with respect to the fixed mold; and after the housing and the rear holders are molded in the molds, the rear holders are pivoted and temporarily retained when at least one of the molds or some mold is run in parallel to another out of the movable molds.

Therefore, as the rear holders are pivoted and temporarily retained only when some movable mold of the temporarily retaining mold is moved, a relatively simple structure and a driving method can be adopted, which makes it possible to not only improve productivity but also obtain an inexpensive connector with rear holders.

In the method of producing the connector with the rear holders according to the invention, the temporarily retaining mold for molding and temporarily retaining the housing and the rear holders includes the fixed mold, the first movable mold for forming the outer shell of the housing and the inner shells of the rear holders, the second movable molds for movably supporting the first movable mold in the axial direction of the first movable mold, the third movable molds for forming the outer shells of the rear holders, and the fourth movable molds for forming and holding the central portion of the housing; and after the housing and the rear holders are molded in the molds, the second movable molds are estranged from the fixed mold and moved back up to the position where the first movable mold holds the rear end portion of the housing, and the third movable molds are moved into the space produced inside the third movable molds, whereby the retaining holes of the rear holders are mated with the respective temporarily retaining projections; each of the rear holders is pivoted forwardly and downwardly on the temporarily retaining projection; the retaining pawl is mated with the retaining step; and simultaneously the undersurface of each of the rear holders is brought into contact with the contact face, so that the rear holders are temporarily retained in the housing.

Therefore, as the first, second and fourth movable molds can be moved laterally only by vertically moving the third movable molds, a relatively simple structure and a driving method can be adopted, which makes it possible to not only improve productivity but also obtain an inexpensive connector with rear holders.

What is claimed is:

1. A method of manufacturing a connector including a housing having a plurality of terminal housing chambers, and a rear holder adapted to be retained at a temporarily retaining position of said housing in which connecting terminals are respectively housed in said plurality of terminal housing chambers and a regularly retaining position of said housing in which said connecting terminals are respectively retained in said plurality of terminal housing chambers, said method comprising the steps of:

providing a temporarily retaining mold for molding and temporarily retaining said housing and said rear holder, said temporarily retaining mold including a fixed mold and a plurality of movable molds movable with respect to said fixed mold;

molding said housing and said rear holder in said temporarily retaining mold;

linearly moving at least one of said plurality of movable molds so that said rear holder is rotated with respect to said housing by contact with said housing and retained at said temporarily retaining position.

2. A method of manufacturing a connector including a housing having a plurality of terminal housing chambers, and a rear holder adapted to be retained at a temporarily retaining position of said housing in which connecting terminals are respectively housed in said plurality of terminal housing chambers and a regularly retaining position of said housing in which said connecting terminals are respectively retained in said plurality of terminal housing chambers, said method comprising the steps of:

providing a temporarily retaining mold for molding and temporarily retaining said housing and said rear holder, said temporarily retaining mold including a fixed mold, a first movable mold for molding an outer shell of said housing and an inner shell of said rear holder, a second movable mold for movably supporting said first movable mold in an axial direction, a third movable mold for molding an outer shell of said rear holder, and a fourth movable mold for molding and retaining a central portion of said housing;

molding said housing and said rear holder in said temporarily retaining mold;

separating said second movable mold from said fixed mold;

moving said first movable mold with respect to said second movable mold and said housing so that said fourth movable mold partially retains said housing;

moving said third movable mold to a space which is produced inside said third movable mold so that said rear holder is rotated with respect to said housing and retained at said temporarily retaining position.

3. A method of manufacturing a connector according to claim 2, wherein said second movable mold is separated from said fixed mold in said axial direction.

4. A method of manufacturing a connector according to claim 3, wherein said first moveable mold is moved in said axial direction with respect to said second movable mold.

5. A method of manufacturing a connector according to claim 4, wherein said third movable mold is moved in a direction substantially perpendicular to said axial direction.

6. A method of manufacturing a connector according to claim 1, wherein said rear holder is rotated with respect to said housing and retained at said temporarily retaining position when at least one of said movable molds or part of one of said movable molds is subjected to parallel movement in relation to said fixed mold.

7. A method of manufacturing a connector according to claim 2, wherein said first, second and fourth molds can be moved laterally when said third mold is moved vertically.

* * * * *